United States Patent
Bolinth et al.

(10) Patent No.: US 7,460,465 B2
(45) Date of Patent: Dec. 2, 2008

(54) METHOD FOR REDUCING SIGNALING OVERHEAD IN A MULTICARRIER SYSTEM WITH DYNAMIC BIT ALLOCATION AND CORRESPONDING TRANSMITTER/RECEIVER DEVICE

(75) Inventors: Edgar Bolinth, Mönchengladbach (DE); Wolfgang Gröting, Oberhausen (DE); Ralf Kern, Bocholt (DE); Giancarlo Lombardi, Den Haag (DE)

(73) Assignee: Siemens Aktiengesellschaft, Munich (DE)

( * ) Notice: Subject to any disclaimer, the term of this patent is extended or adjusted under 35 U.S.C. 154(b) by 962 days.

(21) Appl. No.: 10/476,280

(22) PCT Filed: Apr. 27, 2001

(86) PCT No.: PCT/DE01/01622

§ 371 (c)(1), (2), (4) Date: Feb. 13, 2004

(87) PCT Pub. No.: WO02/089436

PCT Pub. Date: Nov. 7, 2002

(65) Prior Publication Data

US 2004/0174808 A1 Sep. 9, 2004

(51) Int. Cl.
H04J 11/00 (2006.01)
H04B 1/38 (2006.01)
G06F 15/173 (2006.01)

(52) U.S. Cl. ........................ 370/206; 370/208; 375/222; 709/238

(58) Field of Classification Search ................. 370/206, 370/208, 237, 238, 260; 375/222, 260; 709/238–242
See application file for complete search history.

(56) References Cited

U.S. PATENT DOCUMENTS

| | | | |
|---|---|---|---|
| 5,596,604 A * | 1/1997 | Cioffi et al. | 375/260 |
| 5,832,445 A * | 11/1998 | Gao et al. | 704/200.1 |
| 6,249,543 B1 * | 6/2001 | Chow | 375/219 |
| 6,798,735 B1 * | 9/2004 | Tzannes et al. | 370/207 |

FOREIGN PATENT DOCUMENTS

| | | |
|---|---|---|
| WO | WO 99/20027 | 4/1999 |
| WO | WO 00/54473 | 9/2000 |

* cited by examiner

*Primary Examiner*—Hong Sol Cho
(74) *Attorney, Agent, or Firm*—Baker Botts L.L.P.

(57) ABSTRACT

A method for reducing signaling overhead in a multicarrier system with dynamic bit allocation per subcarrier and a corresponding transmitter/receiver device, are provided wherein an established bit allocation table (BAT) that is provided with an index (I) is stored in a BAT storage device (LUT). In order to reduce signaling overhead, only the corresponding index (I) of an existing bit allocation table is transmitted (S6).

12 Claims, 5 Drawing Sheets

S1 Channel characteristics determination
S2 BAT determination
S3 nein no
   ja  yes
S3' Number BAT > MAX
S4 Store and index BAT in LUT
S5 Index + BAT transmission
S6 BAT index transmission
S7 Determination of difference in respect of subsequent BAT
S8 Index + Difference transmission

| Stand der Technik | Prior art |
| --- | --- |
| Sender | Transmitter |
| Eingangsdaten | Input data |
| Kodierung | Coding |
| Impulsformung | Pulse shaping |
| Bat-Signalisierung | BAT signaling |
| Empfänger | Receiver |
| Ausgangsdaten | Output data |
| Dekodierung | Decoding |
| Empfangsfilter | Receiver filter |
| Kanal | Channel |

| | |
|---|---|
| S1 | Channel characteristics determination |
| S2 | BAT determination |
| S3 | nein   no |
| | ja   yes |
| S4 | Store and index BAT in LUT |
| S5 | Index + BAT transmission |
| S6 | BAT index transmission |

S1  Channel characteristics determination
S2  BAT determination
S3  nein    no
    ja      yes
S3' Number BAT > MAX
S4  Store and index BAT in LUT
S5  Index + BAT transmission
S6  BAT index transmission
S7  Determination of difference in respect of subsequent BAT
S8  Index + Difference transmission

| Empfänger | Receiver |
| Unterträger | Subcarriers |
| Bitladevorrichtung | Bit loading device |
| BAT-Signalisierung | BAT signaling |
| Anpassung an Kanaleigenschaften | Adjustment to channel characteristics |

| Sender | Transmitter |
| Unterträger | Subcarriers |
| BAT-Signalisierung | BAT signaling |
| Anpassung an Kanaleigenschaften | Adjustment to channel characteristics |

METHOD FOR REDUCING SIGNALING OVERHEAD IN A MULTICARRIER SYSTEM WITH DYNAMIC BIT ALLOCATION AND CORRESPONDING TRANSMITTER/RECEIVER DEVICE

The present invention relates, generally, to a method for reducing signaling overhead in a multicarrier system with dynamic bit allocation and a corresponding transmitter/receiver device and, in particular, to method and a device for minimizing signaling overhead in an OFDM data transmission system with adaptive bit loading.

Conventional multicarrier systems transmit and receive digital signals using a number of subcarriers or subchannels with different frequencies. A transmitter splits a transmission signal into a number of components, assigns the components to a defined subcarrier, codes each subcarrier according to its components and transmits each subcarrier via one or more transmission channels.

The maximum quantity of information, which can be coded on a specific subcarrier, is hereby a function of the signal-to-noise ratio (SNR) in respect of the subcarrier. The signal-to-noise ratio of a transmission channel can, however, be frequency-dependent, so that the maximum quantity of information that can be coded on a subcarrier varies from subcarrier to subcarrier.

The method known as the bit loading method here allows specific allocation of respective bits or bit values to subcarriers or subchannels based, for example, on a dominant signal-to-noise ratio on the subcarrier. A bit loading algorithm hereby provides the values for what is known as a bit allocation table (BAT), which specifies a quantity of information to be coded for a respective subcarrier or assigns the quantity of information to this.

FIG. 1 shows a simplified block diagram of a multicarrier system according to the prior art. The multicarrier system basically includes a transmitter 1, a transmission medium or channel 2 and a receiver 3. When a bandpass system is implemented, an RF modulation system 4 with an RF modulator 5 and an RF demodulator 6 also can be used as an option.

According to FIG. 1, serial input data to be transmitted is first converted, for example, to a parallel data stream in a serial/parallel converter 10. The parallel data stream is then coded by a coding stage 11 based on a transmitter-side bit allocation table 15. More precisely, a signal space constellation is assigned to each carrier, which is dependent on a dominant signal-to-noise ratio and which is defined or optimized by a bit loading algorithm as a bit allocation table only during an initialization or training phase in the conventional multicarrier system. The signal thus coded (in the frequency domain) is then shaped into suitable transmission pulses in a pulse shaper 12 and transferred by a time domain modulator 13 into a time domain, thereby generating a multicarrier signal, for example. The multicarrier signal is then combined by an aggregator 14.

At the receiver 3, which is set up in a symmetrical manner in respect of the transmitter 1 according to FIG. 1, the subchannels or subcarriers of the received signal or the input data values are first separated, transferred by a frequency domain modulator 16 back into the frequency domain, (low-pass) filtered in a receiver filter and fed to a discriminator 18 after a number of further processing stages (not shown). During a training phase the discriminator input data values arriving at the discriminator 18 are differentiated and compared via a noise variance determination device 7 with reference signals or reference data values (RefX) known on the receiver side, thereby determining the noise variance or noise power of the respective discriminator input data values. A receiver-side bit allocation table 9 is written or adjusted on the basis of this noise variance via a bit loading device 8 or a bit loading algorithm executed therein. The transmitter-side bit allocation table 15 is aligned, for example, via a backward or control channel, which is generated during BAT signaling, with the receiver-side bit allocation table 9. The discriminator 18 is then used, for example, to assign the imprecise discriminator input data value to a (precise) value of a predefined value quantity of a transmission format used (e.g., 4QAM). A subsequent decoding stage 19 can then decode the received data, for example, based on the values in the bit allocation table 9, with a parallel/serial converter 20 converting the parallel data stream back into a serial data stream.

To implement an adaptive data transmission system, such bit allocation tables not only can be determined once during an initialization phase or training phase but also can be implemented continuously at predefined time intervals based on the respective channel characteristics or transmission characteristics of the transmission channel 2, resulting in dynamic bit allocation. Generally, after modification of the channel characteristics or at regular time intervals, the respective transmission characteristics are determined, a corresponding bit allocation table is established and these are aligned during BAT signaling via the backward or control channel. As such bit allocation tables include, however, a relatively high data volume, the useful data rate of the multicarrier system is reduced at the same time.

A modem for digital subscriber line (DSL) communication is known from WO 99/20027, which reacts to interruptions in the context of malfunctions, as occur during the transition from "on-hook" status to "off-hook" status, by rapid switching of stored control parameters, which define communication via the transmission channels for different transmission conditions.

An object of the present invention is, therefore, to provide a method for reducing signaling overhead in a multicarrier system with dynamic bit allocation and a corresponding transmitter/receiver device, with which signaling overhead is reduced and the useful data rate is improved.

SUMMARY OF THE INVENTION

According to the present invention, by using a BAT storage device to store a number of indexed bit allocation tables, when an established bit allocation table corresponds to a bit allocation table stored and already indexed in the BAT storage device, it is possible only to transmit a corresponding index to implement a BAT alignment during signaling, thereby reducing substantially the data quantities transmitted during signaling and, therefore, allowing higher useful data rates.

Preferably, when an established bit allocation table does not correspond to an already stored and indexed bit allocation table, verification can be carried out of a specific number of bit allocation tables stored in the BAT storage device, whereby if a maximum number of stored bit allocation tables is exceeded, the difference in respect of a subsequent stored bit allocation table is determined and only the difference and the index of the subsequent stored bit allocation table are transmitted to implement a BAT alignment during signaling.

In this way, an optimized alignment again can be implemented when the storage capacity of the BAT storage device is limited, resulting in minimized signaling data and better utilization of useful data rates.

Preferably, a bit allocation table includes a number of subcarrier groups and a number of corresponding group bit values per subcarrier group, so that, unlike a bit allocation table in which a corresponding bit value is assigned to each subcarrier, the quantity of data necessary for the BAT alignment is again reduced during BAT signaling and the useful data rate can be increased.

Moreover, the multicarrier system preferably include an OFDM data transmission system (orthogonal frequency division multiplexing) in which adaptive modulation is particularly used.

In addition, the BAT storage device preferably has a domain with permanently predefined bit allocation tables, which are stored, for example, in a ROM. Preferred possible bit constellations then can be stored statically beforehand, allowing further optimization for specific uses.

Additional features and advantages of the present invention are described in, and will be apparent from, the following Detailed Description of the Invention and the Figures.

DETAILED DESCRIPTION OF THE INVENTION

The present invention is described below using an OFDM data transmission system (orthogonal frequency division multiplexing) with adaptive bit loading, whereby however other multicarrier systems also can be used such as, for example, MC-CDMA modulation (Multi-Carrier Code Division Multiple Access) or CDMA modulation (Code Division Multiple Access).

OFDM transmission technology offers the option of high-capacity communication via channels with inter-symbol interference. This technology has proved suitable when used for wireless transmission (e.g., DAB, DVB-T, Hyperline/2) and for wired data transmission (e.g., ADSL, UDSL). Similarly, this transmission technology also can be used with the low-voltage network for messaging applications. Such data transmission systems are known, for example, as "power line" transmission systems.

In an OFDM data transmission system with adaptive bit loading, the data rate is calculated as follows:

$$\text{Data rate} = (N_{NUTZ} \times B_{CARRIER})/(N/B + T_{GUARD}),$$
whereby $N_{NUTZ}$=number of useful subcarriers, $B_{CARRIER}$=mean bits per useful subcarrier, N=number of subcarriers, B=system bandwidth in Hz and $T_{GUARD}$=guard time interval in seconds.

If maximum m bits are to be transmitted per useful carrier, the modulation valency for each useful subcarrier has to be transmitted from the receiver to the transmitter at defined time intervals t. If the most robust transmission possible is assumed, a maximum one bit per useful subcarrier is used for signaling. This reduces the available data rate to:

$$\text{Data rate}^* = (N_{NUTZ} \times B_{CARRIER})/(N/B + T_{GUARD}) \times (1 - m \times (N/B + T_{GUARD})/t)$$

For example, if $N/B + T_{GUARD} = 0.138$ ms, m=3, and t=5 ms, an available data rate* of 0.9232 of the overall data rate results.

m hereby defines the number of bits to define status in the respective modulation alphabet.

It is preferably assumed with the present invention that the channel characteristics change but that similar conditions still exist, as is the case, in particular, in low-voltage networks or what are known as power line networks. According to the present invention, a signaling overhead is to be minimized in an OFDM data transmission system with adaptive bit loading.

EMBODIMENT 1

Figure 2:
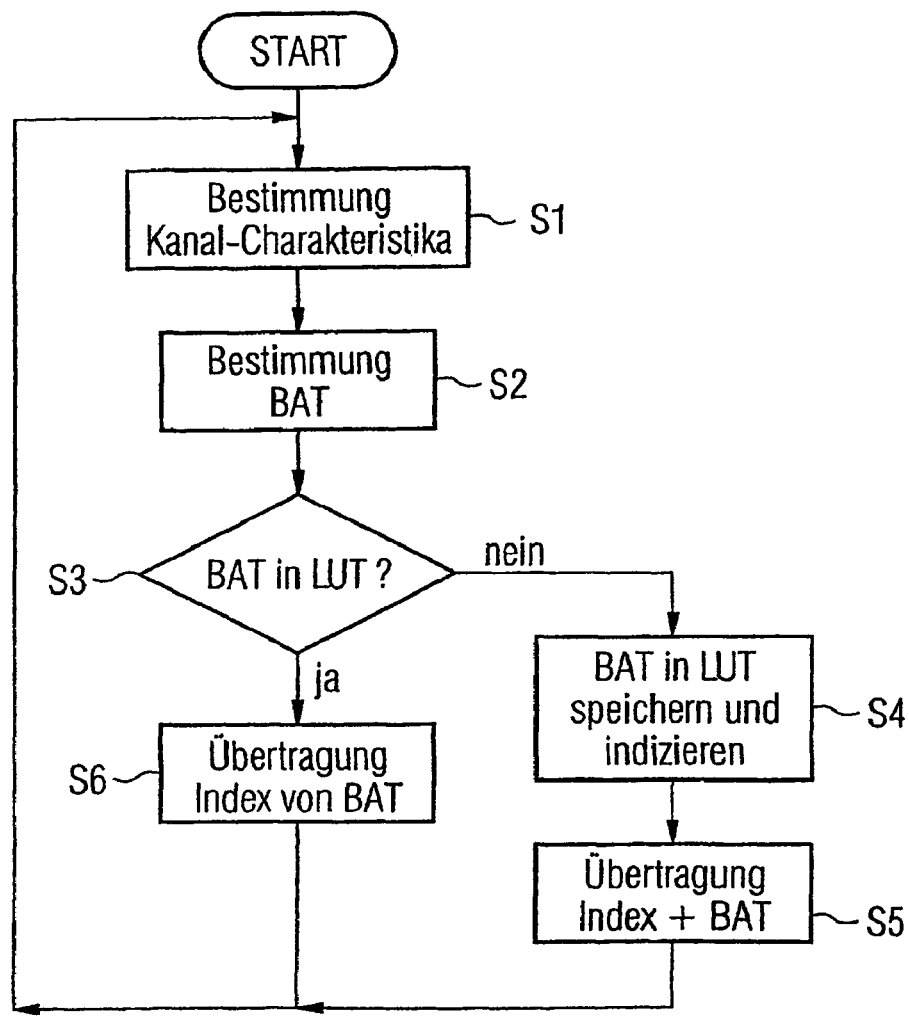
FIG. 2 shows a simplified representation of a flow diagram exemplifying significant method stages according to a first embodiment of the present invention.

FIG. 2 shows a simplified flow diagram to show significant method stages to reduce signaling overhead in a multicarrier system according to a first embodiment of the present invention.

According to FIG. 2, a respective transmission characteristic of a transmission channel is first determined in a stage S1 and in a subsequent stage S2 a respective bit allocation table or what is known as a bit loading constellation BAT is established on the basis of these channel characteristics. In the simplest case such a bit allocation table includes a number of bit values, which are assigned to a number of subcarriers.

| Subcarrier | UT1 | UT2 | UT3 | ... | $UTn_{NUTZ}$ |
|---|---|---|---|---|---|
| Bit value | 1 bit | 2 bit | 1 bit | ... | 2 bit |

At the beginning of a respective transmission, the current bit allocation table BAT is transmitted between a receiver and a transmitter and stored both in the receiver and in the transmitter as a table entry in what is known as a BAT storage device or what is known as a bit-loading-look-up table LUT.

Within the next BAT signaling required to implement a BAT alignment between the receiver and the transmitter, according to FIG. 2 it is first verified in a stage S3 whether the bit loading constellation or the established bit allocation table BAT already exists as an entry in the BAT storage device LUT. More precisely, a comparison is carried out here between the established bit allocation table BAT and bit allocation tables stored in the BAT storage device LUT. If it is determined in this stage S3 that the established bit allocation table does not correspond to one of the stored bit allocation tables, in a stage S4 the established bit allocation table BAT is stored in the BAT storage device LUT along with the already stored bit allocation tables, and indexing is carried out. More precisely, when each bit allocation table BAT is stored, an index I is assigned, which preferably includes an ascending numerical value. The value stored in the BAT storage device or the bit-loading-look-up table LUT then appears as follows:

| Index I | UT1 | UT2 | UT3 | ... | UTn$_{NUTZ}$ |
|---------|-----|-----|-----|-----|--------------|
| 1 | 1 bit | 2 bit | 1 bit | ... | 2 bit |

In a subsequent stage S5 to implement a BAT alignment during signaling the established bit allocation table BAT is transmitted together with the assigned index I and stored in the transmitter-side BAT storage device LUT$_S$. The program sequence then returns to stage S1, with the channel characteristic again being determined and, in the event of a change, a corresponding bit allocation table being established in stage S2.

In stage S3 it is again established whether the new bit allocation table already exists in the BAT storage device and, if this is not the case, it is stored, for example, with the new index I=2 and transmitted, for example, to the transmitter for alignment as follows:

| Index I | UT1 | UT2 | UT3 | ... | UTn$_{NUTZ}$ |
|---------|-----|-----|-----|-----|--------------|
| 2 | 2 bit | 2 bit | 1 bit | ... | 3 bit |

With the method implemented until now, no increase is achieved in the useful data rate, as the full data set of the bit allocation table BAT has to be transmitted during signaling, as with the prior art.

If, however, in particular at a later time at which a number of bit allocation tables BAT already been stored in the BAT storage device LUT, there is a correspondence between the established bit allocation table and one of the stored bit allocation tables in the BAT storage device LUT, only the index I of the corresponding and already stored bit allocation table BAT is transmitted to implement a BAT alignment during signaling. If, for example, there are only 32 bit allocation table entries and, therefore, only 32 indices in the BAT storage device LUT, ideally only 5 bits are then required for full signaling of the bit loading constellation or bit allocation table instead of for example, m×N$_{NUTZ}$=3×256=768 bits. This results in a significant minimization of signaling overhead, with the available useful data rate then being approximately the same as the data rate of the OFDM data transmission system.

EMBODIMENT 2

Figure 3:
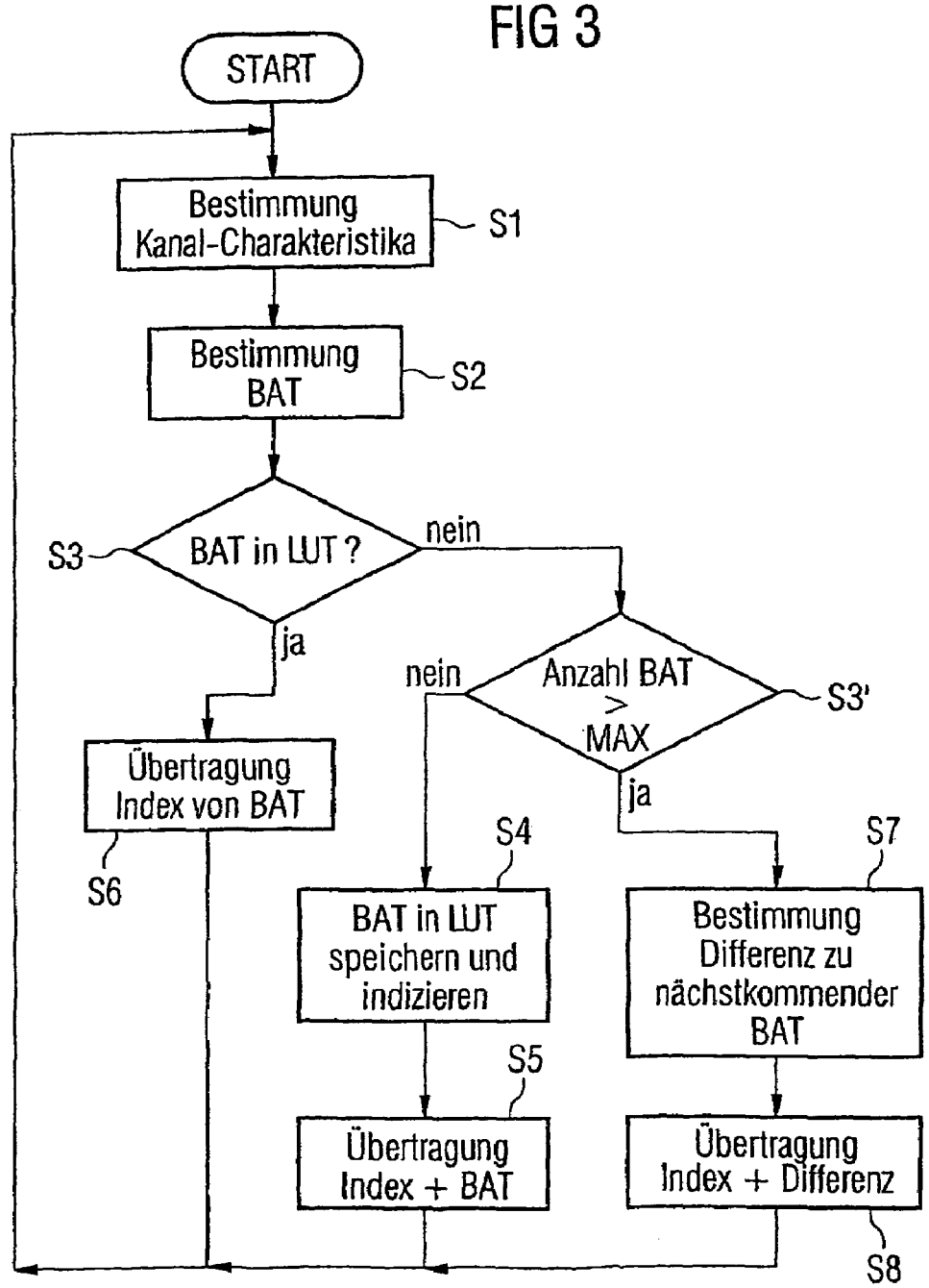
FIG. 3 shows a simplified representation of a flow diagram exemplifying significant method stages according to a second embodiment of the present invention.

FIG. 3 shows a simplified presentation of a flow diagram to show significant method stages according to a second embodiment of the present invention, whereby the same references denote the same or similar method stages such that a detailed description is not given below.

According to FIG. 3, in a stage S1 a transmission characteristic of a respective channel is again established or determined, preferably using a signal-to-noise ratio SNR. Based on the established channel characteristics in stage S2, a corresponding bit allocation table or bit loading constellation BAT is determined or established, in order to obtain minimal bit error rates on the respective subcarriers or a maximum data rate on the channel. As shown in FIG. 2 in a stage S3 it is verified whether the established bit allocation table BAT is already stored in the BAT storage device LUT, whereby if the established bit allocation table corresponds to one of the stored bit allocation tables in stage S6 only the corresponding index I of the already stored bit allocation table is transmitted. The same reduction of signaling overhead is therefore achieved for bit allocation tables already stored in the BAT storage device as with the first embodiment.

According to FIG. 3, however, if the established bit allocation table does not correspond to the stored bit allocation tables in a stage S3' a further verification is carried out of the number of bit allocation tables stored in the BAT storage device LUT, so that only a maximum number of bit allocation tables is stored in the BAT storage device. In this way, storage capacity can be reduced significantly, for example, both on the transmitter and receiver side.

If the maximum number MAX of the bit allocation tables BAT stored in the BAT storage device is exceeded, or if the capacity of the storage device is reached, in a stage S7 the difference D in respect of a subsequent stored bit allocation table is determined. More precisely, the established bit allocation table is, for example, compared with all the bit allocation tables already stored, so that any difference in respect of the respective bit values in the respective subcarriers is minimal. The subsequent stored bit allocation table can for example be a stored bit allocation table, the mean value of which is minimal in respect of the established differences per subcarrier.

The difference D is obtained here from the number of the respective subcarrier and a corresponding difference value in respect of the current bit constellation. If the resulting total number of bits to be transmitted is greater than the transmission of the full bit allocation table BAT, the established bit allocation table will be transmitted. If this is not the case however, according to stage S8 the previously established difference D including the number of the subcarrier and the corresponding difference value and the index of the subsequent bit allocation table taken into account in the difference consideration is transmitted. On the transmitter side, the established bit allocation table is again reconstructed from the transmitted information including the index and the difference in respect of the subsequent bit allocation table and used for adjustment to the channel characteristics. If the storage devices are of different sizes, the bit allocation table reconstructed in this way also can be stored in the BAT storage device on either the transmitter or receiver side.

If, however, it is established in stage S3' according to FIG. 3 that a maximum number of stored bit allocation tables has not yet been reached, in a stage S4 the established bit allocation table is again stored and indexed and in a stage S5 it is transmitted to implement a BAT alignment during signaling.

In this way, a reduction in signaling overhead is again achieved in an OFDM transmission system, with the result that the useful data rate can be increased further.

The limit, up to which transmission of the index I (M=number of table entries) and the numbers of the changing subcarriers (L) is meaningful, is calculated as follows:

$m \times N_{NUTZ} > 1d(M) + (L \times 1d(N_{NUTZ}) \times m),$ $L < (m \times N_{NUTZ} - 1d(M))/(1d(N_{NUTZ} \times m)),$ and $L < 32.$ With, for example, N$_{NUTZ}$=256, M=3 and M=32, this type of transmission is only meaningful if a maximum 31 subcarriers change or are different compared with the established bit allocation table.

An extension of this implementation involves the option whereby the BAT storage device is partially static or has a domain with permanently predefined bit allocation tables. More precisely, a domain with possible bit constellations or bit allocation tables is already allocated, so that a specific adjustment to respective channel characteristics can be implemented. A read/write storage device RAM would then not be required for the static part of the storage device or the look-up table LUT and a BAT storage device could be set up using a comprehensive read-only storage device (ROM), with which L is (almost always) smaller than the limit value $$(m \times N_{NUTZ} - 1d(M))/(1d(N_{NUTZ} \times m)).$$

EMBODIMENT 3

To reduce signaling overhead further, an intelligent difference consideration can be implemented in conjunction with, or in addition to, the method disclosed above. For example, signaling overhead can be further reduced by allocating bit and performance distributions for subchannel groups or subcarrier groups. This has the advantage that when l bits are combined in a subcarrier group, signaling overhead can be reduced by a factor of l.

As a result, bit allocation tables now include a number of subcarrier groups with a number of corresponding group bit values. Such a block allocation of modulation methods, however, essentially results in poorer adaptation to channel characteristics, with the result that an increased bit error rate can be anticipated. In the particular case of a power line transmission environment in particular however the small bandwidth results in there being only a small channel frequency selectivity, so that only a slow change takes place in the signal-to-noise ratio SNR between adjacent subcarriers. Essentially a bit allocation can be based on the minimum SNR of the blocks or groups, so that an adequate bit error rate can be ensured as a result even for the poorest subcarriers in the group. Preferably, with such a reduction in signaling overhead, bit allocation takes place with the bit loading algorithm of CHOW CIOFFI and BINGHAM with performance scaling.

If this block allocation of modulation methods is implemented without performance adjustment, less than 20 percent of an OFDM system is required for signaling using the modulation valency and code rate assumed above. This may allow the additional use of spread techniques for transmitting the bit loading information or bit allocation table BAT with significantly disrupted channels.

A transmitter and receiver device is described below for implementing the method described above.

Figure 1:
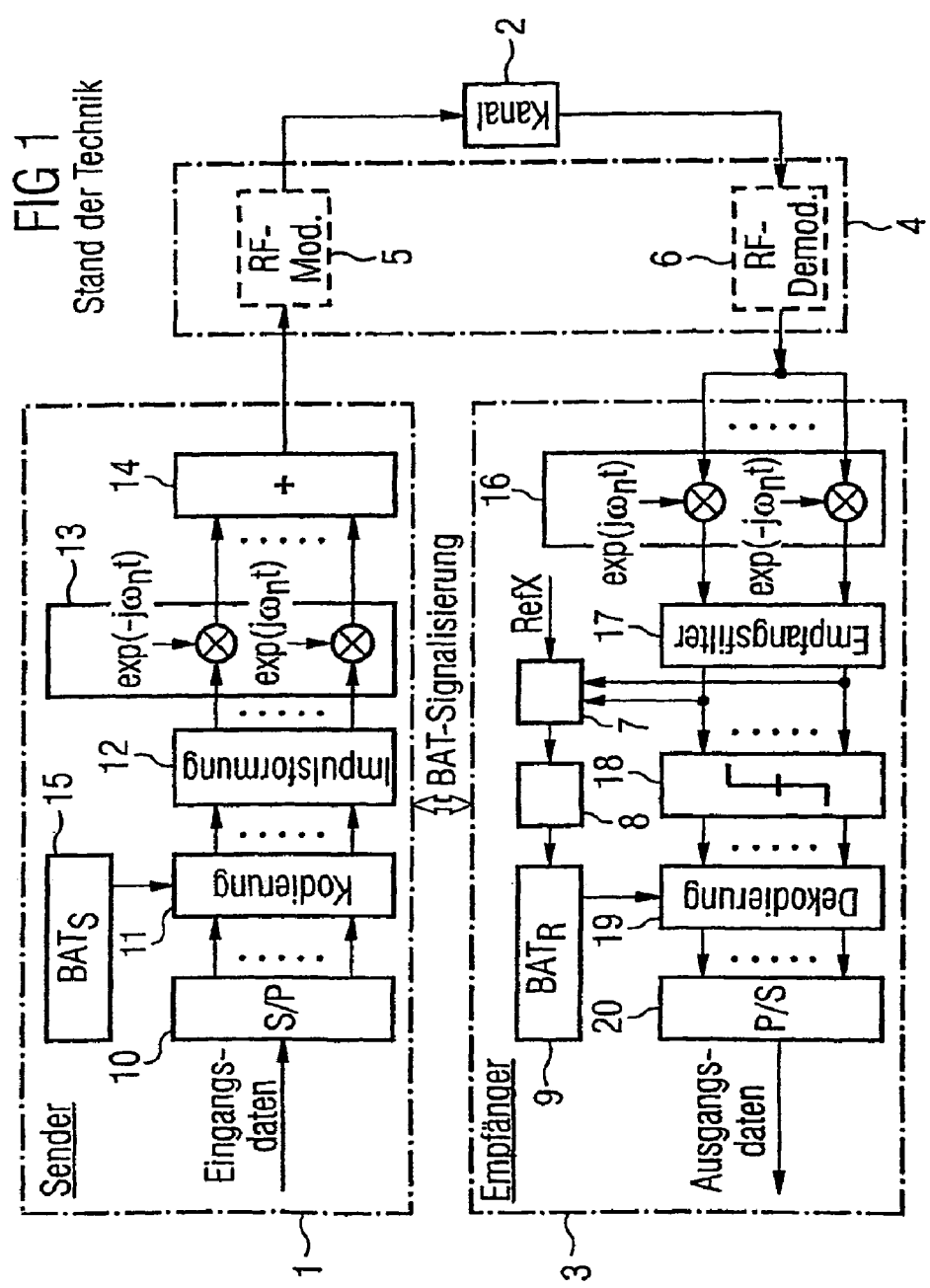
FIG. 1 shows a simplified block diagram of a multicarrier system according to the prior art.
Figure 4:
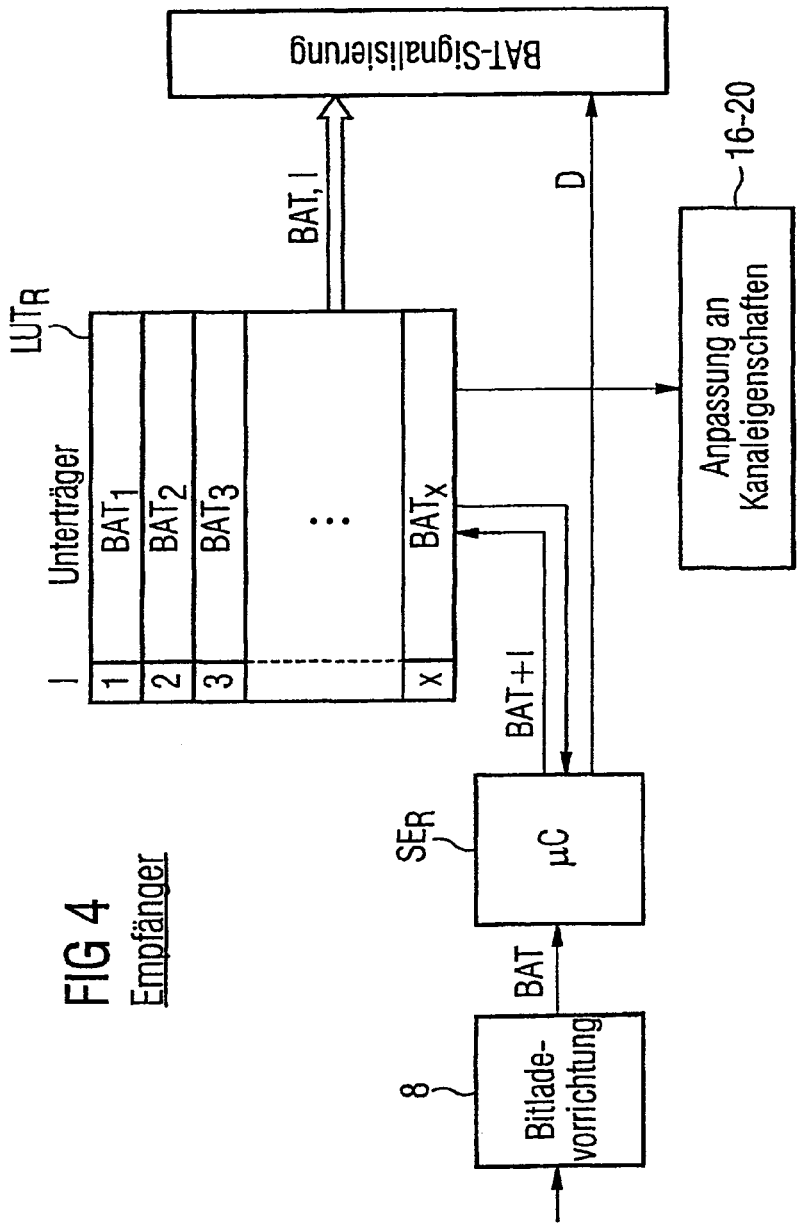
FIG. 4 shows a simplified block diagram of a receiver according to the present invention.

FIG. 4 shows a simplified block diagram of a receiver, whereby the reference 8 denotes a bit loading device for implementing a bit loading algorithm. In this bit loading device 8 a current bit allocation table BAT is established based on, for example, signal to noise ratios and fed to a receiver control unit SER for analysis of the generated bit allocation table BAT. The receiver control unit is for example a microprocessor or microcomputer. The receiver also has a BAT storage device $LUT_R$ for storing a number of bit allocation tables BAT1 to BATx and corresponding indices I=1 to x. For adjustment to the respective channel characteristics the function blocks known from the prior art according to FIG. 1 can for example be activated based on a respective bit allocation table BAT, so that optimal adjustment to the respective transmission characteristics of a channel results.

To implement a BAT alignment during signaling, only an index I is transmitted, if the bit allocation table BAT generated by the bit loading device 8 corresponds to a bit allocation table BAT1 to BATx stored in the BAT storage device $LUT_R$.

If this is not the case, according to the method disclosed in FIGS. 2 and 3 the generated bit allocation table BAT is indexed and stored together with its index I in the BAT storage device $LUT_R$ and released for transmission.

In addition, a difference consideration and/or grouping of the established bit allocation table can be implemented according to FIG. 4 in such a way that a difference D is determined in respect of a subsequent bit allocation table and then transmitted and/or a grouping of the generated bit allocation table is implemented according to the method disclosed above. Either case results in a reduced quantity of data, as either only the index I or the index I with the difference D in respect of the subsequent bit allocation table has to be transmitted.

Figure 5:
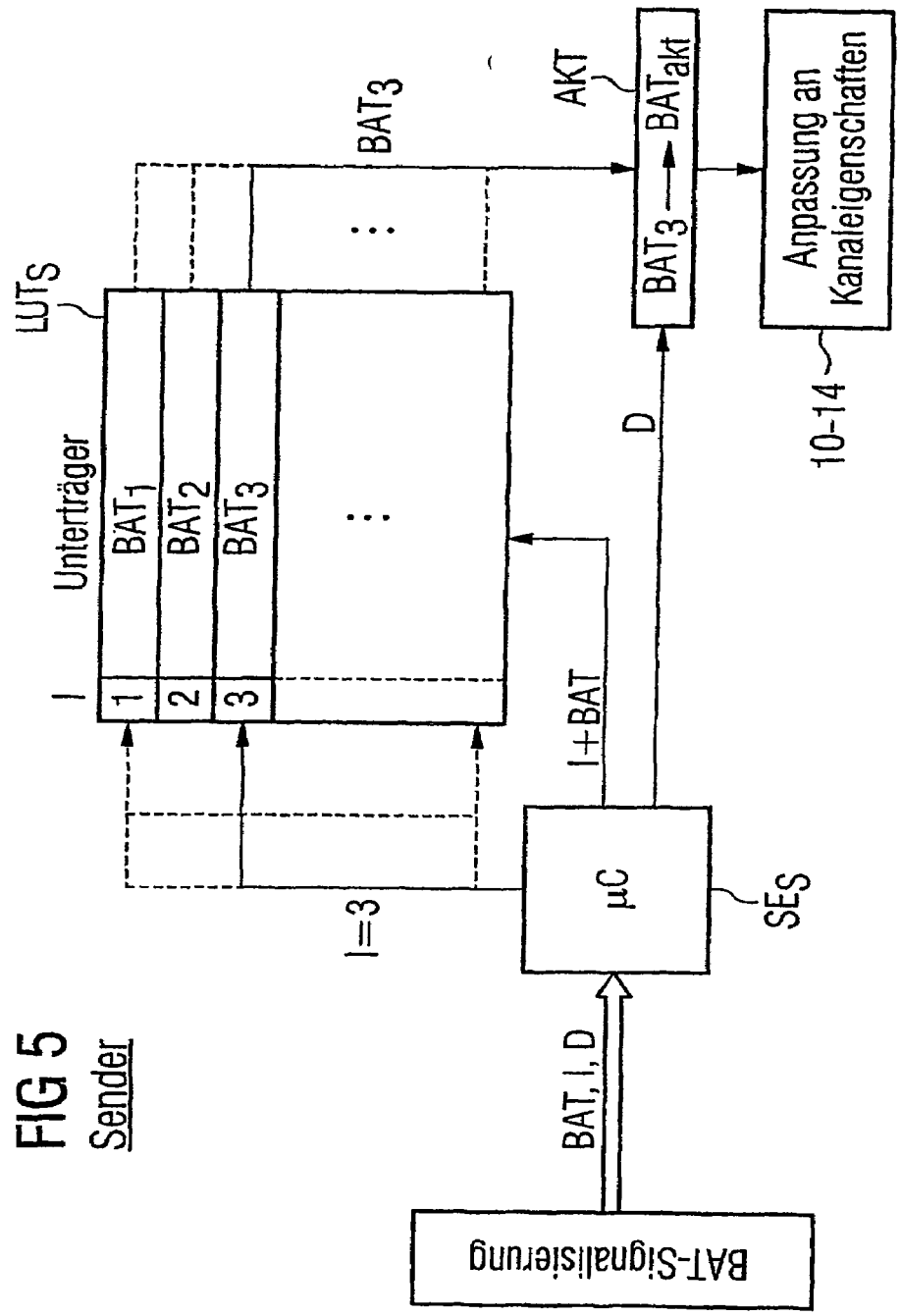
FIG. 5 shows a simplified block diagram of a transmitter according to the present invention.

FIG. 5 shows a simplified block diagram of a transmitter device according to the present invention, whereby the same references again denote the same or similar elements such that a repeat description is not given below.

According to FIG. 5, a bit allocation table BAT, an index I and/or a difference D are received in a transmitter via the backward or control channel and analyzed by a transmitter control unit $SE_S$ according to the method disclosed above. More precisely, on receipt of a bit allocation table with corresponding index I, these values are stored in the transmitter-side BAT storage device $LUT_S$, creating a copy of the receiver-side BAT storage device. In the event that only an index I is transmitted, the transmitter control unit $SE_S$ activates the BAT storage device LUTS so that function blocks 10 to 14 (not shown) are made available to the bit allocation table BAT stored under the respective index I for adjustment to channel characteristics. Also in the case of a difference consideration and/or intelligent difference consideration, the transmitted index I and a corresponding difference are analyzed by the transmitter control unit $SE_S$ so that the subsequent bit allocation table in the BAT storage device is selected via the index I and fed to a BAT update device AKT. The current bit allocation table $BAT_{AKT}$ is then reconstructed in the BAT update device AKT using the additionally transmitted difference value D and the subsequent bit allocation table $BAT_3$ and then output for adjustment to the channel characteristics. Similarly, the transmitter control unit can resolve a grouping in the bit allocation table implemented in each instance in the receiver device and implement a respective adjustment. In this way the signaling overhead in a multicarrier system with dynamic bit allocation can be reduced economically and the useful data rate can be improved.

The present invention was disclosed for reasons of clarity solely in relation to a data transmission in one direction. However, it relates equally to a data transmission in the opposite direction. The present invention was also disclosed using an OFDM data transmission system. It is not, however, restricted to such as it covers all other wireless or wired multicarrier systems with dynamic bit allocation.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for reducing signaling overhead in a multicarrier system with dynamic bit allocation, the method comprising the steps of:

establishing transmission characteristics of a transmission channel;

establishing a bit allocation table based on the established transmission characteristics;

comparing the established bit allocation table with bit allocation tables stored and indexed in a storage device;

determining if the established bit allocation table corresponds to one of the stored bit allocation tables and, if so, transmitting only an index of the corresponding stored bit allocation table to implement a bit allocation table alignment during signaling; and determining if the established bit allocation table does not correspond to one of the stored bit allocation tables and, if not, performing the additional step of:

verifying a number of bit allocation tables stored in the storage device and, if a maximum number of bit allocation tables stored in the storage device is exceeded, performing the additional steps of:

determining a difference in respect of a subsequent stored bit allocation table; and transmitting both the difference and the index of the subsequent stored bit allocation table.

2. A method for reducing signaling overhead in a multicarrier system with dynamic bit allocation as claimed in claim 1, wherein if the maximum number of bit allocation tables stored in the storage device is not exceeded, the following additional steps are performed:

storing the established bit allocation table in the storage device and assigning an index; and transmitting the established bit allocation table with the assigned index to implement a bit allocation table alignment during signaling.

3. A method for reducing signaling overhead in a multicarrier system with dynamic bit allocation as claimed in claim 1, wherein if the established bit allocation table does not correspond to one of the stored bit allocation tables, the following additional steps are performed:

storing the established bit allocation table in the storage device and assigning an index; and transmitting the established bit allocation table with the assigned index to implement a bit allocation table alignment during signaling.

4. A method for reducing signaling overhead in a multicarrier system with dynamic bit allocation as claimed in claim 1, wherein the bit allocation tables comprise a plurality of subcarriers and a plurality of corresponding bit values per subcarrier.

5. A method for reducing signaling overhead in a multicarrier system with dynamic bit allocation as claimed in claim 1, wherein the bit allocation tables comprise a plurality of subcarrier groups and a plurality of corresponding group bit values per subcarrier group.

6. A method for reducing signaling overhead in a multicarrier system with dynamic bit allocation as claimed in claim 1, wherein the bit allocation tables are used to implement adaptive modulation.

7. A method for reducing signaling overhead in a multicarrier system with dynamic bit allocation as claimed in claim 1, wherein the multicarrier system is at least one of an OFDM, an MC-CDMA and a CDMA data transmission system.

8. A method for reducing signaling overhead in a multicarrier system with dynamic bit allocation as claimed in claim 1, wherein the storage device comprises a domain with permanently predefined bit allocation tables.

9. A receiver device for reducing signaling overhead in a multicarrier system with dynamic bit allocation, comprising:

a bit loading device for generating bit allocation tables based on established channel characteristics;

a receiver controlled unit for analyzing the generated bit allocation tables; and a storage device for storing a number of bit allocation tables as well as an index for each bit allocation table;

wherein the receiver control unit only outputs an index for transmission to implement a bit allocation table alignment during signaling if the generated bit allocation table corresponds to a bit allocation table stored in the storage device, and adjustment to modified channel characteristics is carried out based on the generated bit allocation table, with the receiver control unit verifying a number of bit allocation tables stored in the storage device and, if a maximum number of bit allocation tables stored in the storage device is exceeded, determining a difference in respect of a subsequent stored bit allocation table and outputting the index of the subsequent bit allocation table and the difference in respect of the subsequent stored bit allocation table for transmission to implement a bit allocation table alignment during signaling.

10. A receiver device for reducing signaling overhead in a multicarrier system with dynamic bit allocation as claimed in claim 9, wherein the receiver control unit stores the generated bit allocation table with a corresponding index in the storage device and outputs the generated bit allocation table with the corresponding index for transmission to implement a bit allocation table alignment during signaling if the generated bit allocation table does not correspond to any bit allocation table stored in the storage device.

11. A receiver device for reducing signaling overhead in a multicarrier system with dynamic bit allocation as claimed in claim 9, wherein the multicarrier system is at least one of an OFDM, an MC-CDMA and a CDMA data transmission system.

12. A receiver device for reducing signaling overhead in a multicarrier system with dynamic bit allocation as claimed in claim 9, wherein adjustment to the modified channel characteristics occurs via an adaptive modulation device.

* * * * *